S. MUNSON.
VEHICLE WHEEL.
APPLICATION FILED OCT. 17, 1921.

1,423,674. Patented July 25, 1922.
2 SHEETS—SHEET 1.

Witness:
R. E. Hamilton

Inventor,
Sweney Munson
By Warren D. House
His Attorney

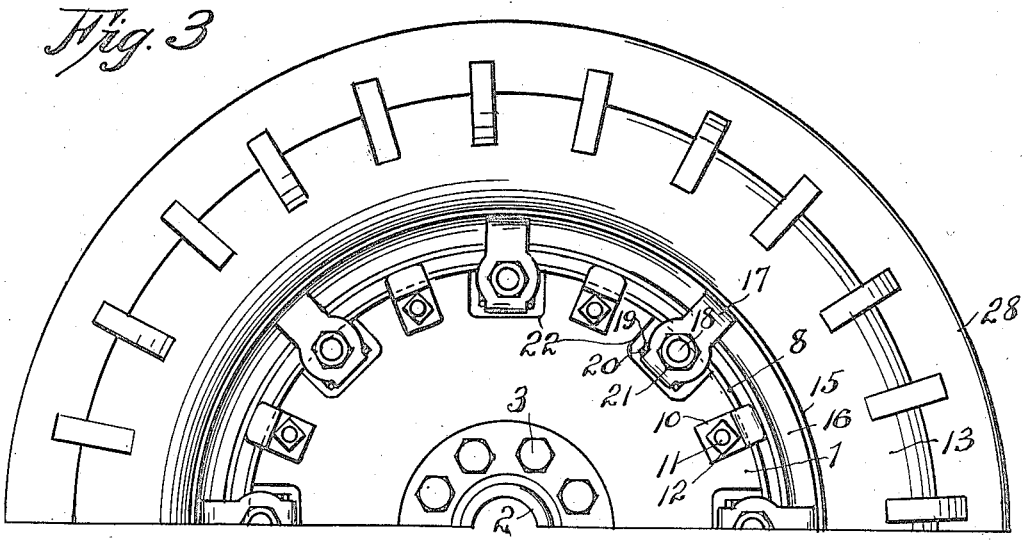
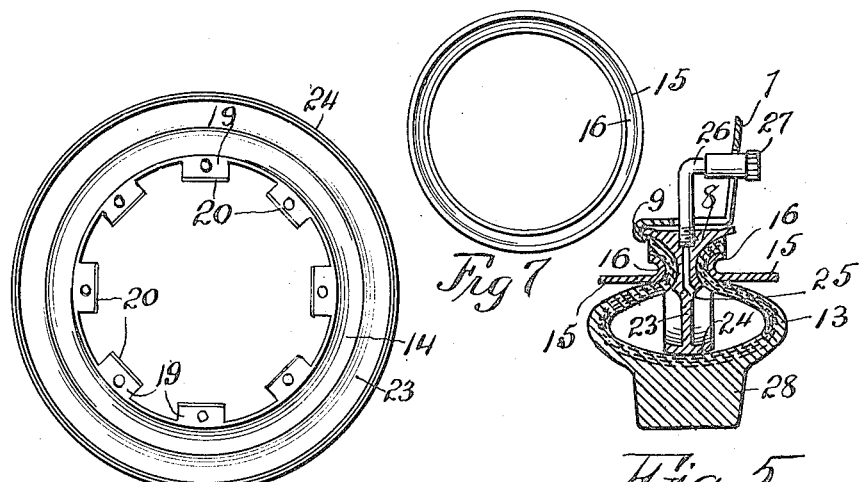
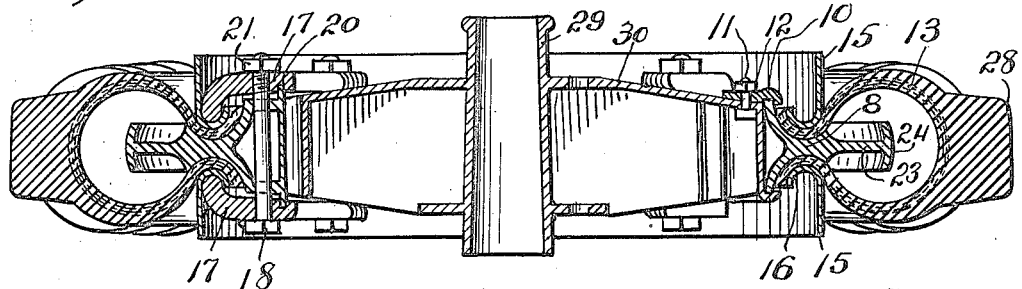

UNITED STATES PATENT OFFICE.

SWENEY MUNSON, OF FOWLER, COLORADO.

VEHICLE WHEEL.

1,423,674. Specification of Letters Patent. Patented July 25, 1922.

Application filed October 17, 1921. Serial No. 508,328.

*To all whom it may concern:*

Be it known that I, SWENEY MUNSON, a citizen of the United States, residing at Fowler, in the county of Otero and State of Colorado, have invented a certain new and useful Improvement in Vehicle Wheels, of which the following is a specification.

My invention relates to improvements in vehicle wheels.

It relates particularly to wheels of the type having inflatable tires.

One of the objects of my invention is to prevent rim cutting of the tire, when the tire becomes deflated, and the wheel is run thereon.

A further object of my invention is to provide a novel construction which eliminates the inflatable inner tube.

A further object of my invention is to provide a novel demountable rim and novel means for clamping the tire thereto.

Still another object of my invention is to provide in the device of the kind described, a construction which is simple, cheap to make, durable and not liable to get out of order, and which may be applied to wheel bodies now in use.

The novel features of my invention are hereinafter fully described and claimed.

In the accompanying drawings, which illustrate my invention,

Fig. 3 is an elevation of the outer side of one half of the wheel shown in Figs. 1 and 2.

Fig. 4 is a side elevation of my improved rim, reduced.

Fig. 5 is a cross section on the line 5—5 of Fig. 1.

Fig. 6 is a horizontal sectional view of a form of my invention in which the hub is an integral portion of the central body.

Fig. 7 is a reduced side elevation of one of the clamping rings.

Similar reference characters designate similar parts in the different views.

Figure 1:
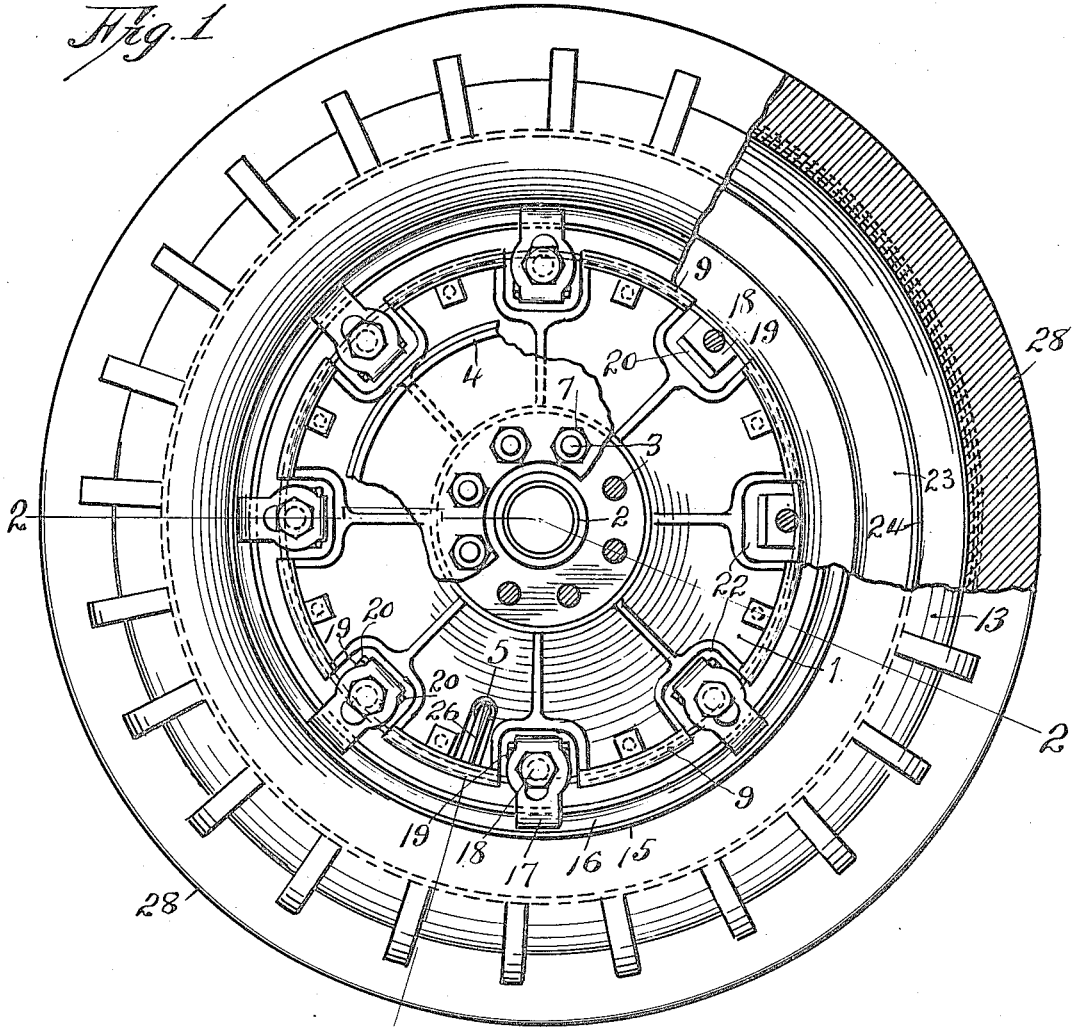
Fig. 1 is an inside view, partly in elevation, partly in vertical section, and partly broken away, of my improved vehicle wheel.
Figure 2:
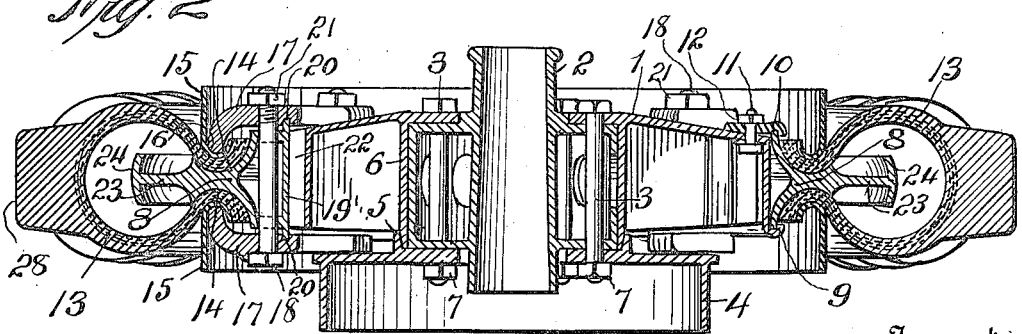
Fig. 2 is a sectional view of the same, on the line 2—2 of Fig. 1.

In the preferred embodiment of my invention, shown in Figs. 1, 2 and 3, the wheel is provided with a central body having an annular portion 1, in which is fitted a hub 2, which is clamped to the portion 1, by bolts 3, which extend transversely through the hub 2 and portion 1 and through a brake drum 4, having an annular flange 5, in which is fitted the adjacent end of a tubular extension 6, of the portion 1, in which the hub 2 is fitted. Nuts 7 on the bolts 3, bear against the outer side of the drum 4.

8 designates a rim, arranged to be slipped laterally onto and off from the periphery of the portion 1, in the manner usual with demountable rims and which at one side edge is adapted to extend under and bear against arcuate peripheral lips 9 with which the inner side of the portion 1 is provided.

For holding the rim 8 in operative position, I provide the usual clamping members 10 respectively secured to the portion 1 by bolts 11, having mounted thereon nuts 12, which bear against the outer sides respectively of the clamping members 10.

13 designates the body of an inflatable tire which on its inner periphery is longitudinally divided and through which divided portion extends the rim 8. The latter is provided on its opposite side respectively with annular concave seats 14, in which respectively bear opposite sides of the divided portion of the tire, which is rigidly clamped against said seats by rings 15, which respectively force the tire 13 into the seats 14 and holds the tire firmly in said seats.

Each ring 15 is provided at its inner end and inner side with an annular concave seat 16, in which are fitted the outer inwardly turned ends of clamping members 17, which are arranged in pairs, each pair being mounted upon a transverse bolt 18, which extends through an adjacent inwardly extending projection 19 on the inner side of the rim 8.

Each clamping member 17 on its inner side is provided at the inner side of the adjacent bolt 18 with a groove in which is fitted a lateral flange 20, on the adjacent side of the adjacent projection 19. The head of each bolt 18 bears against one of the clamping members 17 of the adjacent pair, and a nut 21 on the other end of the bolt bears against the other clamping member of the pair.

The body portion 1 is provided with peripheral notches 22 adapted to respectively receive therein the projections 19 of the rim, whereby the rim may be slipped laterally into and out of operative position on the body portion 1. The bolts 18 properly position the clamping members 17 and hold them from relative circumferential movement. By locating the projections 19 in the notches 22, substantial circumferential movement of the rim on the body 1 is prevented.

The rim 18 is provided with a peripheral radial extension 23, having a circular periphery provided with a transversely convex relatively broad bearing surface 24, which, when the tire is inflated is out of contact with the inner wall thereof, but when the tire is deflated, the latter is adapted to have a bearing against the broad curved surface 24, whereby rim cutting of the tire is prevented when the tire is run in the deflated condition, as shown in Fig. 5. As shown in the last named figure, each of the clamping rings 15 has a relatively wide laterally extending annular portion which presents a broad surface against which the deflated tire can bear without liability of being cut by said ring.

By having the laterally extending annular portions of the clamping rings 15 disposed horizontally, as shown, the tire when deflated can not bear against the outer edges of said horizontal portions.

As shown in Fig. 5, the rim 8 is provided with a radial passage 25, which at its outer end communicates with the interior of the tire 13, and which at its inner end communicates with a filling tube 26, having a threaded outer end fitted in a threaded hole in the rim 8, said filling tube 26 being provided with the usual valve mechanism and the usual removable cap 27.

The outer periphery of the tire 13 may be provided with a relatively radially thick tread portion 28.

In assembling the parts the radial portion 23 of the rim is slipped into the tire after which the rings 15 are applied to opposite sides respectively of the tire, following which the bolts 18 with the clamping members 17 are mounted in position, and the nuts 21 are applied to the bolts so as to force the clamping members 17 against the annular seats 16 of the rings 15, thereby tightly clamping the tire 13 in the seats 14 through the intermediacy of the rings 15.

The tire may then be inflated in the usual manner through the filling tube 26, and the rim slipped on to the body portion 1 and against the lips 9, the body 1 having a notch 27 adapted to receive therethrough the tube 26, see Fig. 5. The clamping members 10 are then clamped to the rim 8 by applying and tightening the nuts 12 on the bolts 11.

In case that the tire becomes deflated and run in that position, it will bear against the broad curved surface 24 of the rim, and will not be injured to any material extent by being run for a limited period of time in the deflated condition. Thus, in ordinary cases, it will not be necessary to at once substitute an inflated tire for the deflated one, so that the operator of a machine may drive the same without changing tires to some place suitable to him for making a change of tires.

In Fig. 6, the hub 29 of the wheel is shown as an integral part of the central body portion 30. In this form of my invention the tire, rim and tire and rim clamping securing means are the same as in the form of my invention shown in the other figures.

By means of the construction described, the rim with the tire secured thereon is readily demountable from the body. By having the tire clamped in the concave grooves 14 by the rings 15, and the latter held in position by the clamping members 17, through the intermediacy of the bolts 18 which extend through the rim projections 19, but not through the tire, the latter is not weakened and may readily be released from the rim by merely loosening the nuts 21 and without removing the bolts 18 from the rim.

I do not limit my invention to the structure shown and described, as many modifications, within the scope of the appended claims may be made without departing from the spirit of my invention.

What I claim is.

1. In a vehicle wheel, a rim having an annular peripheral tire bearing surface, an inflatable tire having a longitudinally divided inner periphery and into which the rim extends, the tire when inflated being out of contact with said surface, and when deflated, being arranged to bear against said surface, two clamping rings which respectively press opposite sides of the tire against opposite sides of the rim, each of said rings having a relatively wide laterally extending horizontal annular portion against which the deflated tire is adapted to bear, and means for clamping said clamping rings against the tire and against said rim, substantially as set forth.

2. In a vehicle wheel, a rim, an inflatable tire having a longitudinally divided inner periphery and into which the rim extends, two clamping rings which respectively press opposite sides of the tire against opposite sides of the rim, each of said rings having a relatively wide laterally extending horizontal annular portion against which the deflated tire is adapted to bear, and means for clamping said clamping rings against the tire and against said rim, substantially as set forth.

3. In a vehicle wheel, a rim having in opposite sides respectively two annular grooves, an inflatable tire having a longitudinally divided inner periphery and into which the rim extends, two clamping rings which respectively press opposite sides of the tire into said grooves, each of said rings having a relatively wide laterally extending horizontal annular portion against which the deflated tire is adapted to bear, and means for clamping said clamping rings against the tire and against said rim, substantially as set forth.

4. In a vehicle wheel, a body having peripheral notches and peripheral lips intermediate of said notches, a demountable rim on the periphery of said body bearing at one side against said lips and having projections extending respectively into said notches and arranged to hold the rim from substantial circumferential movement on the body, and releasable means for holding the rim against said lips and against the periphery of the body, substantially as set forth.

5. In a vehicle wheel, a body having peripheral notches and peripheral lips intermediate of said notches, a demountable rim on the periphery of said body bearing at one side against said lips and having projections extending respectively into said notches and arranged to hold the rim from substantial circumferential movement on said body, releasable means for holding the rim against said lips and against the periphery of the body, and tire clamping means mounted on said projections respectively and adapted for lateral insertion through said notches, substantially as set forth.

6. In a vehicle wheel, a body having peripheral notches, and peripheral lips intermediate of said notches, a demountable rim on the periphery of said body bearing at one side against said lips and having projections extending respectively into said notches and arranged to hold the rim from substantial circumferential movement on said body, releasable means for holding the rim against said lips and against the periphery of the body, two tire clamping rings adapted to press a tire against opposite sides respectively of said rim, two sets of clamping members arranged to bear respectively against said clamping rings, and bolts extending respectively through said projections and arranged to clamp said clamping members against the rim and against said rings, substantially as set forth.

7. In a vehicle wheel, a rim provided in opposite sides respectively with two annular grooves, two rings adapted to respectively clamp opposite sides of an inflatable tire in said grooves, clamping members bearing against said rim at opposite sides thereof and bearing against said rings respectively, and bolts extending through said rim at the inner side of the tire and connecting opposite clamping members, substantially as set forth.

8. In a vehicle wheel, a rim provided in opposite sides respectively with two annular grooves, an inflatable tire having a longitudinally divided inner periphery into which the rim extends, two rings adapted to respectively clamp opposite sides of the tire against said rim in said grooves, clamping members bearing against said rim at opposite sides thereof, and bearing against said rings respectively, and bolts extending through said rim at the inner side of the tire and at the inner side of said rings and connecting opposite clamping members, substantially as set forth.

9. In a vehicle wheel, a body having at one side a peripheral lip and provided at its other side and in its periphery with a notch, a rim mounted on the periphery of the body and bearing one side against said lip and provided with a radial air inlet adapted to communicate at its outer end with the interior of an inflatable tire when the latter is mounted on the rim, releasable means for holding the rim against said lip and against the periphery of the body, and a filling tube mounted in the inner end of said air inlet and extending through and insertable into and removable from said notch, when the rim is slipped on or off from the body laterally, substantially as set forth.

In testimony whereof I have signed my name to this specification.

SWENEY MUNSON.